(12) United States Patent
Nagashima et al.

(10) Patent No.: US 8,156,763 B2
(45) Date of Patent: Apr. 17, 2012

(54) METHOD OF PRODUCING GLASS

(75) Inventors: Yukihito Nagashima, Tokyo (JP); Kengo Maeda, Mie (JP)

(73) Assignee: AvanStrate, Inc., Mie (JP)

( * ) Notice: Subject to any disclaimer, the term of this patent is extended or adjusted under 35 U.S.C. 154(b) by 803 days.

(21) Appl. No.: 12/084,857

(22) PCT Filed: Nov. 13, 2006

(86) PCT No.: PCT/JP2006/322575
§ 371 (c)(1),
(2), (4) Date: May 12, 2008

(87) PCT Pub. No.: WO2007/058146
PCT Pub. Date: May 24, 2007

(65) Prior Publication Data
US 2009/0266111 A1    Oct. 29, 2009

(30) Foreign Application Priority Data
Nov. 15, 2005  (JP) ................................. 2005-330811

(51) Int. Cl.
C03B 5/225    (2006.01)
C03C 6/00    (2006.01)

(52) U.S. Cl. ...................... 65/134.3; 65/134.1; 65/134.9; 501/27; 501/66

(58) Field of Classification Search .................... 501/27, 501/66; 65/134.1, 134.3, 134.9
See application file for complete search history.

(56) References Cited

U.S. PATENT DOCUMENTS

| | | | |
|---|---|---|---|
| 3,973,975 A | | 8/1976 | Francel et al. |
| 4,615,989 A | * | 10/1986 | Ritze ................. 501/44 |
| 5,420,082 A | * | 5/1995 | Maugendre et al. ........... 501/35 |
| 6,000,241 A | * | 12/1999 | Ranade et al. ............... 65/17.2 |
| 6,664,203 B2 | | 12/2003 | Nagashima et al. ........... 501/66 |
| 7,700,870 B2 | * | 4/2010 | Thomsen et al. ............. 136/251 |
| 7,743,630 B2 | * | 6/2010 | Krasnov et al. ............. 65/60.53 |
| 2004/0018934 A1 | * | 1/2004 | Ott et al. ..................... 501/66 |
| 2005/0209083 A1 | * | 9/2005 | Takagi et al. ................ 501/11 |
| 2006/0248923 A1 | * | 11/2006 | Krasnov et al. .............. 65/99.2 |
| 2006/0249199 A1 | * | 11/2006 | Thomsen et al. ............. 136/252 |

FOREIGN PATENT DOCUMENTS

| | | |
|---|---|---|
| DE | 10 2004 026 257 | 11/2005 |
| EP | 1 199 287 | 4/2002 |
| JP | 10-114538 A | 5/1998 |
| JP | 10-231139 A | 9/1998 |
| JP | 11-035338 A | 2/1999 |
| JP | 11-049520 A | 2/1999 |
| JP | 2001-261370 | 9/2001 |
| JP | 2001-328820 A | 11/2001 |
| JP | 2003-300750 A | 10/2003 |
| JP | 2005-132713 A | 5/2005 |
| JP | 2005-172881 A | 6/2005 |

OTHER PUBLICATIONS

Machine translation of JP 2005-172881 A, Jun. 30, 2005.*
Machine translation of JP 11-035338 A, Feb. 9, 1999.*
Machine Translation of JP 2005-132713 A, May 26, 2005.*
Machine Translation of JP 2001-328820 A, Nov. 27, 2001.*
Machine Translation of JP 11-049520 A, Feb. 23, 1999.*
"Handbook of Glass Engineering", edited by M. Yamane et al., Asakura Shoten, 1999, p. 292, Partial English translation.
"Handbook of Glass Engineering", edited by T. Moriya et al., Asakura Shoten, 1963, p. 298, Partial English translation.

* cited by examiner

*Primary Examiner* — Karl Group
*Assistant Examiner* — Elizabeth A Bolden
(74) *Attorney, Agent, or Firm* — Hamre, Schumann, Mueller & Larson, P.C.

(57) ABSTRACT

Provided is a method of producing a glass, including, in order to obtain an excellent refining effect: preparing a raw glass batch including: an antimony compound containing pentavalent antimony; and an oxidizing agent (a cerium oxide, a sulfate, a nitrate); and melting the raw glass batch. In preparing the raw glass batch, it is preferable that the antimony compound be premixed with the oxidizing agent. When the nitrate is used as the oxidizing agent, the raw glass batch is prepared so as to include the antimony compound in an amount of more than 0.5 parts by mass and at most 3 parts by mass, in terms of an amount of antimony pentoxide, per 100 parts by mass of a base glass composition expressed in terms of an amount of an oxide.

6 Claims, No Drawings

METHOD OF PRODUCING GLASS

TECHNICAL FIELD

The present invention relates to a method of producing a glass characterized in its refining process, and particularly to a useful method of producing an alkali-free glass.

BACKGROUND ART

In melting a glass raw material, a so-called refining agent is added. A refining agent has, in general, the effect of growing bubbles by a gas generation through its decomposition and thereby promoting the removal of the bubbles contained in the molten glass in the initial stage of the raw material melting process. In the later stage of the melting process, the refining agent also has an effect of absorbing the gas in residual minute bubbles and promoting the elimination thereof.

In the case of an alkali-free glass, arsenic trioxide ($As_2O_3$) has been used as such a refining agent. The refining function of $As_2O_3$ is attributable to the effect that $As_2O_3$ added to the raw material takes in oxygen from the surroundings in the temperature raising process so that it turns into $As_2O_5$, and then $As_2O_5$ releases the oxygen when it turns back to $As_2O_3$ again at a higher temperature. Therefore, when using arsenic trioxide as a refining agent, an oxidizing agent is added into the glass raw material in order to accelerate the change from $As_2O_3$ to $As_2O_5$ in the initial stage of the melting reaction of the material. As such an oxidizing agent, a nitrate commonly is used.

Meanwhile, it is known that antimony trioxide ($Sb_2O_3$) shows the same effect as $As_2O_3$. "Handbook of Glass Engineering" (edited by Masayuki Yamane, et al., Asakura Shoten, 1999, p. 292) describes that antimony trioxide ($Sb_2O_3$) is "less toxic than arsenic trioxide, and therefore has more often been used instead of arsenic trioxide."

Recently, in various fields, there have been concerns about the adverse impacts of the use of toxic substances on the environment. Also in the field of an alkali-free glass mainly used for TFT liquid crystal display substrates, the replacement of $As_2O_3$, which has conventionally been used as a refining agent, with more environment-friendly $Sb_2O_3$ has been proposed (see, for example, JP10-114538A and JP10-231139A).

JP10-114538A discloses an alkali-free glass production method in which $As_2O_3$ is not used as a refining agent, characterized in that "0.05 to 2 wt % of $SnO_2$ and 0.05 to 3 wt % of $Sb_2O_3$ are added as refining agents."

JP10-231139A discloses an alkali-free glass production method in which $As_2O_3$ is not used as a refining agent, characterized in that "0.05 to 3 wt % of $Sb_2O_3$ and 0.01 to 2 wt % of a chloride in terms of $Cl_2$ are added as refining agents."

A compound containing pentavalent antimony sometimes is used as a refining agent, not so often as antimony trioxide ($Sb_2O_3$) that is a trivalent antimony oxide. "Handbook of Glass Engineering" (edited by Taro Moriya, et al., Asakura Shoten, 1963, p. 298) describes that "sodium antimonate ($Na_2O.Sb_2O_5.1/2H_2O$) or sodium orthoantimonate ($Na_3SbO_4$) have a refining effect."

JP11-35338A discloses "an antimony-based refining agent that is a multiple oxide of pentavalent Sb and at least one element selected from the group consisting of Mg, Zn, Ca, Sr, Ba, Li, K, Al, Si, Ti, Sn, Zr, Ce, La, Nb and P."

JP11-49520A discloses "a glass melting method in which antimony pentoxide is used as a refining agent." In this publication, it is pointed out that when antimony pentoxide is used instead of antimony trioxide as a refining agent, a nitrate that is an oxidizing agent need not be added to change antimony trioxide into antimony pentoxide, and thus if the nitrate need not be added, melting segregation of a raw material caused by the addition of a large amount of nitrate can be reduced (paragraph 0012).

JP11-49520A describes in its Examples the numbers of bubbles measured when antimony pentoxide was added to raw glass batches. Referring to this section, when 0.5 parts by mass of antimony pentoxide was added per 100 parts by mass of the raw glass batch (in terms of an oxide), the number of bubbles measured in the case where a nitrate was not added (Example 3) was less than that measured in the case where the nitrate was added (Example 2) (Tables 2 and 3). Also from the viewpoint of melting segregation, the case where the nitrate was not added (Example 3) was superior to the case where the nitrate was added (Example 2) (Table 4). In view of the above, in the method disclosed by this publication, a nitrate should not be added when antimony pentoxide is used in a raw material (Claim 2).

JP2001-328820A discloses "a glass production method in which a batch of a cullet containing no arsenic oxide and a refining agent other than arsenic oxide are melted to be formed." Examples of a refining agent other than arsenic oxide include $Sb_2O_5$ and/or $SnO_2$.

In the methods described in JP10-114538A, JP10-231139A and JP11-49520A, there is still room for improvement to achieve the required quality of bubbles in the case of a glass that is melted at a high temperature like an alkali-free glass.

The "antimony-based refining agent" described in JP11-35338A has a problem in that it is more expensive than antimony trioxide ($Sb_2O_3$) and antimony pentoxide ($Sb_2O_5$), or that it cannot be used depending on its composition.

In the method described in JP2001-328820A, there is a problem that a sufficient refining effect cannot be obtained in the case of melting a common mixture of glass raw materials with less content of cullet.

DISCLOSURE OF INVENTION

It is an object of the present invention to provide a method of producing a glass capable of solving the problems caused by the use of an antimony oxide as an alternative refining agent to $As_2O_3$, as well as reducing an amount of $As_2O_3$ to be used, preferably without using $As_2O_3$, while ensuring an excellent refining effect.

The present invention provides a method of producing a glass, including preparing a raw glass batch and melting the raw glass batch. The raw glass batch includes: an antimony compound containing pentavalent antimony; and at least one oxidizing agent selected from the group consisting of a nitrate, a sulfate and a cerium oxide. In this method, the raw glass batch is prepared by mixing a mixture obtained by mixing the antimony compound and the oxidizing agent with the remainder of the raw glass batch.

According to this production method, the preliminary mixing of the oxidizing agent and the antimony compound containing pentavalent antimony that serves as a refining agent enhances the cooperative effects between the antimony compound and the oxidizing agent, so that bubbles in the glass can be reduced.

Another aspect of the present invention provides a method of producing a glass, including preparing a raw glass batch and melting the raw glass batch. The raw glass batch includes: an antimony compound containing pentavalent antimony; and a nitrate. In this method, the raw glass batch includes the antimony compound in an amount of more than 0.5 parts by mass and at most 3 parts by mass, in terms of an amount of antimony pentoxide, per 100 parts by mass of a base glass composition expressed in terms of an amount of an oxide.

In the present description, the base glass composition expressed in terms of an amount of an oxide is a composition of the raw glass batch in terms of an amount of an oxide, excluding an amount of an oxide that serves as a refining agent or an oxidizing agent. Examples of an oxide that serves as a refining agent include an antimony oxide, an arsenic oxide and a tin oxide. Examples of an oxide that serves as an oxidizing agent include a cerium oxide.

In the above conversion in terms of an amount of an oxide, the conversion is carried out so that the number of cationic atoms of the composition does not change after the conversion. Therefore, 1 mol of calcium carbonate ($CaCO_3$) is regarded as 1 mol of calcium oxide (CaO). The same is applied to the conversion of an antimony compound (into antimony pentoxide) to be described later. Note that, in converting a raw glass batch in terms of an oxide, a component that cannot be converted into an oxide (for example, chlorine ($Cl_2$)) is expressed as it is.

As disclosed in JP11-49520A, a nitrate causes a problem such as melting segregation rather than enhancing the effect of reducing the number of bubbles when it is used together with a relatively small amount of (at most 0.5 parts by mass of) antimony pentoxide. The study of the present inventors, however, has revealed that in the case of using a relatively large amount of antimony pentoxide as a refining agent, the use in combination with a nitrate improves its refining effect.

Still another aspect of the present invention provides a method of producing a glass, including preparing a raw glass batch and melting the raw glass batch. The raw glass batch includes: an antimony compound containing pentavalent antimony; and a sulfate and/or a cerium oxide.

According to this production method, it is possible to reduce bubbles in the glass by a cooperative effect between the antimony compound containing pentavalent antimony that serves as a refining agent and a sulfate and/or a cerium oxide that serves as an oxidizing agent.

As described above, according to the present invention, it is possible to produce a glass while ensuring an excellent refining effect, even if the amount of $As_2O_3$ to be used is reduced, or it is not even used.

BEST MODE FOR CARRYING OUT THE INVENTION

In the production method of the present invention, it is preferable that the raw glass batch include an antimony compound containing pentavalent antimony in an amount of more than 0.5 parts by mass and at most 3 parts by mass, in terms of an amount of antimony pentoxide, per 100 parts by mass of a base glass composition expressed in terms of an amount of an oxide. The amount of the antimony compound containing pentavalent antimony should be evaluated after any compound containing pentavalent antimony is converted into antimony pentoxide. In the production method of the present invention, it is preferable that the raw glass batch include an antimony compound containing pentavalent antimony in an amount of more than 0.7 parts by mass and at most 3 parts by mass, more preferably more than 1 parts by mass and at most 3 parts by mass, particularly more than 1.5 parts by mass and at most 3 parts by mass, and more particularly more than 2 parts by mass and at most 3 parts by mass, respectively, in terms of an amount of antimony pentoxide, per 100 parts by mass of a base glass composition expressed in terms of an amount of an oxide.

As an oxidizing agent, at least one selected from the group consisting of a nitrate, a sulfate and a cerium oxide is used. Two or more of the above substances may be used as the oxidizing agent. For example, it may include a nitrate as well as a sulfate and/or a cerium oxide.

It is preferable, in the present invention, that the base glass composition expressed in terms of an amount of an oxide be a composition that is substantially free from an alkali metal oxide, and particularly the following composition substantially. In this description, the % expressions indicating components are all mass % expressions.

45 to 70% of $SiO_2$
7.5 to 25% of $Al_2O_3$
4 to 17.5% of $B_2O_3$
0 to 10% of MgO
0 to 10% of CaO
0 to 10% of SrO
0 to 30% of BaO
5 to 30% of MgO+CaO+SrO+BaO
0 to 5% of ZnO
0 to 5% of $TiO_2$
0 to 5% of $ZrO_2$
0 to 1% of $Cl_2$, and
0 to 0.5% of $SO_3$ The above composition may include less than 1%, preferably less than 0.1%, of components typified by $Fe_2O_3$ and $Na_2O$, respectively, in addition to the above components. Particularly in the industrial production of a glass, it is difficult to avoid in some cases that the glass includes a small amount of impurities derived from an industrial raw material. The term "substantially" in the present description means that a small amount of a component, that is, less than 1%, preferably less than 0.5%, and more preferably less than 0.1% of the component, may be included. Therefore, the phrase "a composition that is substantially free from an alkali metal oxide" means a glass including less than 1% of an alkali metal oxide.

In the present invention, it is preferable that the raw glass batch be prepared so as to obtain a glass having a strain point higher than 575° C., and a thermal expansion coefficient in the range from $28 \times 10^{-7}$/° C. to $46 \times 10^{-7}$/° C. In the present invention, it is more preferable that the raw glass batch be prepared such that a temperature at which the viscosity of a molten material of the raw glass batch is $10^2$ dPa·sec is equal to or higher than 1615° C., and so as to obtain a glass having a strain point higher than 630° C.

As an oxidizing agent, a nitrate, particularly an alkaline earth metal nitrate may be included. Preferably, the raw glass batch includes the nitrate in an amount from 2.5 to 25 parts by mass, more preferably from 7.5 to 25 parts by mass, and particularly from 9 to 25 parts by mass, per 100 parts by mass of the base glass composition expressed in terms of an amount of an oxide.

As an oxidizing agent, a sulfate, particularly an alkaline earth metal sulfate may be included. Preferably, the raw glass batch includes the sulfate in an amount from 0.25 to 5 parts by mass, per 100 parts by mass of the base glass composition expressed in terms of an amount of an oxide.

An alkaline earth metal (Group 2 element) to be added as a nitrate and/or a sulfate may be any of Mg, Ca, Sr, and Ba. It is preferable, however, that the raw glass batch is prepared so that the amount of each metal and the total amount of these metals included in the obtained glass are in the preferable ranges as described above or to be described later.

As an oxidizing agent, a cerium oxide may be included. Preferably, the raw glass batch includes a cerium oxide in an amount from 0.1 to 1 parts by mass, per 100 parts by mass of the base glass composition expressed in terms of an amount of an oxide.

As a refining agent, a tin oxide may be included together with an antimony compound. Preferably, the raw glass batch includes the tin oxide in an amount from 0.05 to 1 parts by mass, per 100 parts by mass of the base glass composition expressed in terms of an amount of an oxide.

It is preferable that a refining agent and an oxidizing agent are mixed prior to being mixed with other components of the raw glass batch. More specifically, a mixture of the refining agent and the oxidizing agent is prepared and then this mixture is mixed with the remainder of the raw glass batch, so that the desired raw glass batch is obtained.

In the method of the present invention, at least an antimony compound containing pentavalent antimony is used as a refining agent. As such an antimony compound, antimony pentoxide is preferred. However, the raw glass batch may include an antimony compound containing trivalent antimony such as antimony trioxide. The present invention is particularly effective when it is applied to a raw glass batch that is substantially free from arsenic trioxide.

Hereinafter, the base glass composition of an alkali-free glass that is preferably applicable to the present invention as well as the reasons for the limitation thereof will be described.

$SiO_2$ is an essential component for forming a glass network. Less than 45% content thereof reduces the chemical resistance of a glass as well as lowers the strain point of the glass, so that a sufficient thermal resistance cannot be obtained. More than 70% content thereof increases the viscosity of the glass at higher temperatures, which causes difficulty in melting it. Therefore, the lower limit of the $SiO_2$ content is 45%, and preferably 50%. The upper limit of the $SiO_2$ content is preferably 70%.

$Al_2O_3$ is an essential component for restraining the devitrification of a glass as well as for improving its thermal resistance. Less than 7.5% content thereof easily causes the devitrification. More than 25% content thereof lowers the acid resistance as well as deteriorates the melting behavior. Therefore, the lower limit of the $Al_2O_3$ content is 7.5%, and preferably 10%. The upper limit of the $Al_2O_3$ content is 25%, and preferably 20%.

$B_2O_3$ is an essential component for improving the melting behavior of a glass, for restraining the devitrification, and for improving the chemical resistance, in particular the resistance to a buffered hydrofluoric acid. Less than 4% content thereof deteriorates the melting behavior of the glass as well as lowers the resistance to a buffered hydrofluoric acid to an insufficient level. More than 15% content thereof lowers the strain point of the glass, thereby lowering the thermal resistance to an insufficient level. Therefore, the lower limit of the $B_2O_3$ content is 4%, and preferably 7.5%. The upper limit of the $B_2O_3$ content is 17.5%, and preferably 15%.

At least one selected from the group consisting of MgO, CaO, SrO and BaO is present, and the total content thereof is 5 to 30%. Less than 5% of the total content thereof makes it difficult to melt a glass. More than 30% of the total content thereof increases the expansion coefficient of the glass excessively. Therefore, the lower limit of the total content thereof is 5%, and the upper limit thereof is 30%, and preferably 17.5%.

MgO is a component for improving the melting behavior of a glass without much lowering the strain point. However, more than 10% content thereof raises the devitrification temperature of the glass. Therefore, the upper limit of the MgO content is 10%, and preferably 7.5%.

CaO is a component having the same effects as MgO. More than 10% content thereof raises the devitrification temperature of a glass. Therefore, the upper limit of the CaO content is 10%.

SrO is a component capable of improving the melting behavior of a glass without deteriorating the devitrification of the glass. More than 10% content thereof increases the expansion coefficient of the glass excessively. Therefore, the upper limit of the SrO content is 10%.

BaO is a component capable of restraining the devitrification of a glass. More than 30% content thereof increases the expansion coefficient of the glass excessively. Therefore, the upper limit of the BaO content is 30%, and preferably 15%.

ZnO is a component capable of restraining the devitrification of a glass as well as improving the melting behavior thereof. More than 5% content thereof lowers the strain point of the glass.

$TiO_2$ can be contained up to about 5% within the range not deteriorating the function of a glass as a display substrate.

$ZrO_2$ is a component whose inclusion is desired because it raises the strain point of a glass as well as improving the acid resistance and the alkali resistance. However, more than 5% content thereof easily causes the striae and devitrification as well as deteriorates the melting behavior.

$Cl_2$ is a component that has a refining effect and can remain in a glass as long as its content is up to 1%, and preferably up to 0.5%.

$SO_3$ is a component that can remain in a glass up to 0.5% as a remainder of a sulfate to be used as an oxidizing agent.

Summarizing the above, a glass to which the present invention more preferably can be applied (base glass composition expressed in terms of an oxide) consists substantially of the following components, when expressed by mass % again:

50 to 70% of $SiO_2$ 10 to 20% of $Al_2O_3$ 7.5 to 15% of $B_2O_3$ 0 to 7.5% of MgO 0 to 10% of CaO 0 to 10% of SrO 0 to 15% of BaO 5 to 17.5% of MgO+CaO+SrO+BaO 0 to 5% of ZnO 0 to 5% of $TiO_2$ 0 to 5% of $ZrO_2$ 0 to 0.5% of $Cl_2$, and 0 to 0.5% of $SO_3$

EXAMPLES

Examples 1 to 6

A raw glass batch for each Example was prepared so that it has a base glass composition shown in Table 1 and includes a refining agent and an oxidizing agent shown in Table 2. As described above, the base glass composition was calculated by excluding oxides ($Sb_2O_5$, $SnO_2$) that serve as refining agents and an oxide ($CeO_2$) that serves as an oxidizing agent. A sulfate and a nitrate shown in Table 2 were added as alkaline earth metal salts. Therefore, the alkaline earth metals contained in these salts were counted as oxides in the base glass composition.

TABLE 1

| Component | SiO$_2$ | Al$_2$O$_3$ | B$_2$O$_3$ | MgO | CaO | SrO | BaO |
|---|---|---|---|---|---|---|---|
| Mass % | 60.5 | 15.0 | 7.5 | 1.5 | 5.5 | 4.0 | 6.0 |

As a raw material for the sulfate, a calcium sulfate was used, and as raw materials for the nitrate, magnesium, strontium and barium nitrates were used. The remainders of the raw materials of magnesium, calcium, strontium and barium were their carbonates. As other materials, a silica powder, an alumina, a boric acid, and a cerium oxide were used. As the refining agents, oxides (antimony pentoxide and stannic oxide) were used.

Furthermore, in each of Examples 2 and 6, the antimony pentoxide and the oxidizing agent previously were mixed (premixed) before they were mixed with the base glass raw material. Then, the mixture obtained by the premixing was mixed with the remainder of the raw glass batch.

TABLE 2

|  | Example 1 | Example 2 | Example 3 | Example 4 | Example 5 | Example 6 |
|---|---|---|---|---|---|---|
| Refining agent |  |  |  |  |  |  |
| Sb$_2$O$_5$ | 2.0 | 2.0 | 2.0 | 2.0 | 2.0 | 2.0 |
| SnO$_2$ | — | — | 0.1 | — | 0.1 | 0.1 |
| Oxidizing agent |  |  |  |  |  |  |
| CeO$_2$ | 0.48 | 0.48 | — | — | — | — |
| sulfate | — | — | 1.5 | — | — | — |
| nitrate | — | — | — | 5.1 | 16.2 | 16.2 |
| Premixed | — | Yes | — | — | — | Yes |
| Number of bubbles (pieces/100 g) | 140 | 120 | 150 | 200 | 80 | 50 |

(Components are expressed by mass % in this table)

After each of the batches prepared as described above was melted in an electric furnace at 1600° C. for 4 hours using a platinum crucible, the molten material was poured onto a stainless steel plate and formed into a plate-like shape, and then cooled down to a room temperature. The number of bubbles contained within an area of 5 cm square in the center of each obtained glass was measured using an optical microscope, and then converted into the number thereof per 100 g. The respective results are shown in Table 2.

Comparative Examples 1 and 2, and Reference Example 1

Comparative Example 1 is an example where trivalent antimony was used as the refining agent. Comparative Example 2 is an example where pentavalent antimony was used as the refining agent. Note that Reference Example 1 is an example where arsenic trioxide (As$_2$O$_3$) was used as the refining agent.

Base glass raw materials for Comparative Examples 1 and 2 as well as Reference Example 1 were prepared respectively in the same manner as in Examples. The refining agent and the oxidizing agent were added in the mass percentages shown in Table 3, to 100 parts by mass of each of these base glass raw materials in the same manner as in Examples, so that the batches for Comparative Examples and Reference Example were prepared respectively. Note that in these Comparative Examples and Reference Example, no other oxidizing agents (such as a sulfate) were added.

TABLE 3

|  | Comparative Example 1 | Comparative Example 2 | Reference Example 1 |
|---|---|---|---|
| Refining agent |  |  |  |
| As$_2$O$_3$ | — | — | 1.2 |
| Sb$_2$O$_3$ | 2.0 | — | — |
| Sb$_2$O$_5$ | — | 2.0 | — |
| Total amount of Sb | (2.2) | (2.0) | (—) |
| Oxidizing agent nitrate | 9.4 | 0 | 9.4 |
| Number of bubbles (pieces/100 g) | 280 | 270 | 30 |

(Components also are expressed by mass % in this table. The total amount of Sb denotes the total amount of all the antimony oxides in terms of antimony pentoxide (Sb$_2$O$_5$).)

These batches were melted in the same manner as in Examples so as to obtain glass samples. The numbers of bubbles also were measured in the same manner, and the respective results also are shown in Table 3.

Note that since Comparative Example 1 is an example where antimony trioxide (Sb$_2$O$_3$) was used, the amount thereof in terms of antimony pentoxide (Sb$_2$O$_5$) that is a pentavalent antimony compound also is shown in this table.

The above results of Examples and Comparative Examples show the following.

As is apparent from the results of Examples and Comparative Example 2, it was observed that in the case where a relatively large amount of antimony pentoxide was added, the addition of the oxidizing agent, particularly a cerium oxide or a sulfate, together with the antimony pentoxide significantly improves the refining effect.

As is apparent from the results of Examples 4 and 5, the use of a sufficient amount of the oxidizing agent as well as the further addition of a tin oxide produce a more marked refining effect. Furthermore, in Example 6, although no arsenic trioxide was added, the premixing performed in addition to the preparation in Example 5 resulted in the number of bubbles similar to that obtained in Reference Example 1 where arsenic trioxide was used.

Comparisons between Examples 1 and 2 as well as Examples 5 and 6, respectively, showed that the premixing of the antimony pentoxide and the oxidizing agent before their mixture with the base glass raw material reduces the number of bubbles in the molten glass.

The thermal expansion coefficients of the glass samples obtained in respective Examples were in the range from $28 \times 10^{-7}/°$ C. to $46 \times 10^{-7}/°$ C. (about $37 \times 10^{-7}/°$ C.), and their strain points were 630° C. or higher (about 670° C.). The temperature at which the viscosity of the molten material of the raw glass batch in each Example was $10^2$ d·sec was equal to or higher than 1615° C. (about 1655° C.). Note that the thermal expansion coefficients were measured according to JIS R 3102. The strain points were measured according to JIS R 3103. The viscosities were measured according to JIS R 3104.

INDUSTRIAL APPLICABILITY

The present invention provides a method of producing a glass with an excellent reduction of bubbles with minimal use of arsenic trioxide, and thus has many applications in the field of glass production technology.

The invention claimed is:

1. A method of producing a glass, comprising:
   preparing a raw glass batch comprising:
      an antimony compound containing pentavalent antimony; and
      at least one oxidizing agent selected from the group consisting of a nitrate and cerium oxide; and
   melting the raw glass batch,
   wherein the raw glass batch is prepared by mixing the antimony compound and the oxidizing agent so as to form a mixture and then mixing the mixture with remaining materials of the raw glass batch.

2. The method of producing a glass according to claim 1, wherein the raw glass batch comprises the antimony compound containing pentavalent antimony in an amount of more than 0.5 parts by mass and at most 3 parts by mass, in terms of an amount of antimony pentoxide, per 100 parts by mass of a base glass composition expressed in terms of an amount of an oxide,
   where the base glass composition expressed in terms of an amount of an oxide is a composition of the raw glass batch in terms of an amount of an oxide, excluding an amount of an oxide that serves as a refining agent or an oxidizing agent.

3. The method of producing a glass according to claim 1, wherein the raw glass batch is prepared, as a base glass composition expressed in terms of an amount of an oxide, so as to substantially have a composition of, expressed in mass percentage:
   45 to 70% of $SiO_2$;
   7.5 to 25% of $Al_2O_3$;
   4 to 17.5% of $B_2O_3$;
   0 to 10% of MgO;
   0 to 10% of CaO;
   0 to 10% of SrO;
   0 to 30% of BaO;
   5 to 30% of MgO+CaO+SrO+BaO;
   0 to 5% of ZnO;
   0 to 5% of $TiO_2$;
   0 to 5% of $ZrO_2$;
   0 to 1% of $Cl_2$; and
   0 to 0.5% of $SO_3$,
   where the base glass composition expressed in terms of an amount of an oxide is a composition of the raw glass batch in terms of an amount of an oxide, excluding an amount of an oxide that serves as a refining agent or an oxidizing agent.

4. The method of producing a glass according to claim 1, wherein the raw glass batch is prepared so as to obtain a glass having a strain point higher than 575° C., and a thermal expansion coefficient in the range from $28 \times 10^{-7}$/° C. to $46 \times 10^{-7}$/° C.

5. The method of producing a glass according to claim 1, wherein the raw glass batch is prepared such that a temperature at which a viscosity of a molten material of the raw glass batch is $10^2$ dPa·sec is equal to or higher than 1615° C., and so as to obtain a glass having a strain point higher than 630° C.

6. The method of producing a glass according to claim 1, wherein the raw glass batch further comprises a tin oxide.

* * * * *